US012046877B2

(12) United States Patent
Prankl et al.

(10) Patent No.: US 12,046,877 B2
(45) Date of Patent: Jul. 23, 2024

(54) SPARK PLUG AND METHOD FOR PRODUCING A SPARK PLUG

(71) Applicant: INNIO Jenbacher GmbH & Co OG, Jenbach (AT)

(72) Inventors: Stefan Prankl, Weer (AT); Johann Klausner, St. Jakob i.H. (AT); Robert Grabner, Pogier (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/032,804

(22) PCT Filed: Oct. 22, 2020

(86) PCT No.: PCT/AT2020/060378

§ 371 (c)(1),
(2) Date: Apr. 20, 2023

(87) PCT Pub. No.: WO2022/082232

PCT Pub. Date: Apr. 28, 2022

(65) Prior Publication Data

US 2023/0396041 A1 Dec. 7, 2023

(51) Int. Cl.

*H01T 13/08* (2006.01)
*H01T 13/40* (2006.01)
*H01T 13/54* (2006.01)

(52) U.S. Cl.

CPC ............ *H01T 13/08* (2013.01); *H01T 13/40* (2013.01); *H01T 13/54* (2013.01)

(58) Field of Classification Search

CPC .......... H01T 13/08; H01T 13/40; H01T 13/54
See application file for complete search history.

(56) References Cited

U.S. PATENT DOCUMENTS

| | | | |
|---|---|---|---|
| 9,893,497 B2 | 2/2018 | Chiera et al. | |
| 9,929,542 B2 | 3/2018 | Araya et al. | |
| 2002/0180326 A1 | 12/2002 | Francesconi et al. | |
| 2016/0156159 A1 | 6/2016 | Niessner et al. | |
| 2018/0294625 A1* | 10/2018 | Niessner | H01T 13/06 |

FOREIGN PATENT DOCUMENTS

| | | |
|---|---|---|
| DE | 102014117714 A1 | 6/2016 |
| EP | 1265329 A1 | 12/2002 |
| EP | 3391484 A1 | 10/2018 |
| EP | 3460929 A1 | 3/2019 |
| WO | 2017102465 A1 | 6/2017 |
| WO | 2019126838 A1 | 7/2019 |

OTHER PUBLICATIONS

PCT International Search Report and Written Opinion; Application No. PCT/AT2020/060378; dated Oct. 22, 2020; 10 pages.

* cited by examiner

*Primary Examiner* — Karabi Guharay
(74) *Attorney, Agent, or Firm* — Fletcher Yoder, P.C.

(57) ABSTRACT

A spark plug of an internal combustion engine has a sealing area between a mounting portion (e.g., threads) and an end portion of a housing of the spark plug. The end portion faces a combustion chamber of the internal combustion engine. The spark plug includes a flow control element coupled to the end portion, wherein the flow control element projects beyond an igniter in a direction toward the combustion chamber.

20 Claims, 4 Drawing Sheets

A-A

SPARK PLUG AND METHOD FOR PRODUCING A SPARK PLUG

CROSS-REFERENCE TO RELATED APPLICATION

This application is a National Stage entry from, and claims benefit of, PCT Application No. PCT/AT2020/060378, filed on Oct. 22, 2020; entitled "SPARK PLUG AND METHOD FOR PRODUCING A SPARK PLUG", which is herein incorporated by reference in its entirety.

BACKGROUND

The present invention concerns a spark plug for igniting a combustible fuel in an internal combustion engine, especially for a gas engine without pre-chambers.

Spark plugs are mounted by an mounting portion on a cylinder head or a spark plug sleeve of an internal combustion engine, in a manner that an ignition means is arranged at an end of the spark plug facing the combustion chamber, in particular by screwing, e.g., a male screw portion (or external thread) of a spark plug body, which at least partially surrounds the ignition means, into, e.g., the female screw portion on the cylinder head or the spark plug sleeve (or vice versa).

For sealing the combustion chamber against the environment (i.e., the space outside the combustion chamber at atmospheric pressure), spark plugs as known from the prior art comprise gaskets. These gaskets are provided as sealing washers, which are placed between spark plug and the cylinder head (or the spark plug sleeve) at a sealing area of the spark plug. The sealing area is placed at a portion of the spark plug between the external thread and the terminal nut, so that the external thread is arranged between the sealing area and the combustion chamber.

Such embodiments of the prior art have been disclosed for example in U.S. Pat. No. 9,929,542 B2.

Spark plugs are known in various embodiments in the prior art. Due do the efforts to improve the life time of the internal combustion engine, the requirements regarding gas tightness and temperature management, i.e., enabling proper heat transfer between the spark plugs on the one hand and the cylinder head or the spark plug sleeves on the other hand, became more important.

Therefore, it is also known in the prior art to provide spark plugs with sealing areas located between the mounting portion and an ignition means of the spark plug. On the one hand, using such sealing areas at an end of the spark plug facing the combustion chamber, a thermal conductivity section, which may for example be provided by an external thread of the spark plug, can be kept clean of deposits of the combustion (e.g., soot), which directly affects the thermal conductivity. On the other hand, sealing with a sealing area between the side of the combustion chamber and the mounting portion (e.g., thread) leads to increased effective contact area between the spark plug body (preferably at least partly together with the ground electrode carrier) and thus additionally enhances the thermal conductivity or the heat transfer, respectively. That is, next to the mounting portion, the sealing area itself is then an area where additional heat is transferred. Altogether, the lifetime of a spark plug can be increased significantly in this way.

Such embodiments using sealing areas located between the mounting portion and the ignition means are known from EP 3 460 929 A1 or WO 2019/126838 A1. These spark plugs are configured to be assembled with pre-chambers, acting as ignition amplifiers in order to effectively ignite air fuel mixture in the main combustion chamber.

However, attempts have shown that such spark plugs are not suitable for internal combustion engines, especially gas engines, without pre-chambers since spark plugs are significantly affected by the flow conditions in the region of the ignition location which depend on the flow conditions in the combustion chamber of the respective cylinder. Thus, for example, the ignition spark can be blown out or suppressed if the flow speeds of the gas-air mixture are very high and turbulent.

Hence, it is necessary to arrange the ignition means in the combustion chamber at locations with specific and controlled flow velocity in order to improve the flame propagation during ignition in the combustion chamber.

For this purpose, spark plugs as described in EP 1 265 329 B1 are equipped with a swirl chamber. The disadvantage of such sparks plugs is that the swirl chamber is exposed to a high thermal load, potentially leading to undesired glow ignition in the main combustion chamber.

BRIEF DESCRIPTION

An aspect of the invention is to provide a spark plug and a method for producing a spark plug, wherein the ignition capability of the spark plug is more stable during turbulent flow conditions in main combustion chambers of internal combustion engines without pre-chambers while preventing undesired glow ignition. Another aspect of the invention is to provide a spark plug being capable to fulfill before mentioned requirements and being suitable for internal combustion engines, especially gas engines without pre-chambers.

This is being achieved by a spark plug for igniting a combustible fuel in an internal combustion engine with the features described herein, and an arrangement comprising a cylinder head and/or spark plug sleeve and such a spark plug. Protection is additionally sought for a method for producing a spark plug with the features described herein. Advantageous embodiments of the invention are defined in the claims.

According to certain embodiments of the invention, it is provided that a housing of the spark plug comprises the sealing area and the sealing area is located between the mounting portion and an end portion of the housing, which end portion faces the combustion chamber when the spark plug is mounted in the internal combustion engine, wherein the spark plug further comprises a flow control element attached to or integrated in the end portion of the housing, wherein the flow control element projects beyond the ignition means in a direction towards the combustion chamber when the spark plug is mounted in the internal combustion engine.

The housing can also be referred to as a "spark plug body".

The combustible fuel can preferably be part of an air fuel mixture.

The combustible fuel can be a gaseous fuel, in particular natural gas.

Spark plugs according to aspects of the invention can be used in the main combustion chambers of internal combustion engines (i.e., in the cylinders).

On the one hand, using the housing as a sealing area at an end of the housing facing the combustion chamber, a thermal conductivity section, which may for example be provided by an external thread used as mounting portion of the spark plug, can be kept clean of deposits of the combustion (e.g., soot), which directly affect the thermal conductivity. On the other hand, sealing with a wall in said area leads to increased effective contact area between the spark plug body (preferably at least partly together with the ground electrode carrier) and thus enhances the thermal conductivity or the heat transfer, respectively. Altogether, the lifetime of a spark plug can be increased significantly.

The mounting portion can be designed as a shoulder on the spark plug housing, wherein a retainer nut which can be screwed in the spark plug sleeve or directly in the cylinder head engages with the shoulder in order to mount the spark plug in said spark plug sleeve or cylinder head. In such a case, the thread of the retainer nut can be kept clean while enhancing the heat transfer through the sealing portion.

By use of a flow control element projecting beyond the ignition means in a direction towards the combustion chamber, when the spark plug is mounted in the internal combustion engine, the service life as well as the reliability of the spark plug can be increased.

Enclosing—at least partially—the ignition means by means of the flow control element can achieve controlled flow conditions in respect of the fuel-air mixture at the ignition location.

Additionally, at the ignition location, the flow control element can withstand high turbulence in the vicinity of the ignition location (in particular too high for the ignition means by itself), which prevents that the spark is blown out while supporting a fast and thorough spreading of the combustion from the ignition location throughout the rest of the combustion chamber due to a controlled flow in the area of the spark gap. That results in optimized and rapid combustion of the fuel-air mixture in the combustion chamber of the cylinder.

In some embodiments, the flow control element can be attached to the housing via one or more intermediary parts. In other embodiments, the flow control element can be directly attached to the housing (i.e., directly joined to the housing).

The flow control element can be attached to the housing with a ground electrode carrier as intermediary part. In other words, the ground electrode carrier can be arranged between the housing and the flow control element, wherein the ground electrode carrier, the housing, and the flow control element are joined together (e.g., by welding, especially laser beam welding or brazing—in particular braze welding).

It can be preferably provided that the housing at least partially—preferably fully—surrounds an insulator and/or a middle electrode carrier. Other embodiments of the invention where the ignition is achieved e.g., with a laser, are of course conceivable ("laser spark plug").

It can be provided that the sealing area is located between the mounting portion and the flow control element on an outer surface of the housing, preferably near or at a transition of the housing into the flow control member.

It can be provided that the flow control element is formed by an at least one separate component part, which at least one separate component part is arranged at the housing, wherein preferably the housing and the at least one separate component part are connected by welding, particularly preferably laser beam welding.

It can be provided that the housing comprises a ledge, wherein the at least one separate component part is arranged at the ledge of the housing.

It can be provided that the flow control element is of cylindrical, preferably circular cylindrical, base shape. More preferably, the control element is a ring-shaped circular cylinder, comprising an outer diameter and an inner diameter being smaller than the outer diameter.

Preferably, the outer diameter of the flow control member being smaller than the diameter of the mounting portion, more preferably being smaller than the core diameter of the thread of the thread (mounting portion).

In preferred embodiments, the ratio of the outer diameter of the flow control member and the core diameter of the thread of the thread is between 0.6 and 0.9, more preferably between 0.7 and 0.8. This allows to mount the spark plug, according to embodiments of the invention, in a cylinder head and/or in a spark plug sleeve, such that the flow control member protrudes into the main combustion chamber.

The flow control element can comprise further structure, such as the mass electrode carrier.

The flow control element can comprise openings on the surface of the cylindrical base shape in order to admit some flow of air fuel mixture to the vicinity of the ignition location (transversally with respect to a longitudinal axis of the spark plug), while breaking the flow if the flow velocity in this area would be too high for stable and effective ignition. The openings can at the same time smooth too high turbulence in the flow in order to achieve a controlled and uniform flow in the area of the spark gap. As mentioned before, such turbulence can be beneficial for a fast spreading of the combustion throughout the combustion chamber.

The openings preferably are provided with a diameter of 1.2-1.8 mm, particular preferably 1.5 mm.

The housing can preferably have a first part of a cylindrical base shape and a second part, namely the sealing area, preferably of a conical base shape.

It can be provided that the sealing area is located at a terminal portion of the housing, which terminal portion faces the combustion chamber, when the spark plug is mounted in the internal combustion engine.

It can be provided that the sealing area is designed as a chamfer.

It can be provided that the sealing area is designed as a chamfer extending at least partially onto the housing.

It can be provided that the sealing area designed as the chamfer is at an angle between 20° and 50°, preferably at an angle between 27° and 41°, particularly preferred at an angle of 34°, with respect to a perpendicular of a center axis of the spark plug.

It can be provided that the housing comprises a mounting portion for mounting the spark plug in the internal combustion engine and/or in a cylinder head and/or in a spark plug sleeve. It can be provided that the mounting portion is configured to pre-load the chamfer and/or the sealing area against a surface of a cylinder head or a spark plug sleeve. Therefore, it can be provided that the mounting portion comprises at least a partial external thread.

For all embodiments of the spark plug, it can be provided that, between the sealing area and the spark plug sleeve, an additional sealing means, preferably a sealing ring, is arranged between the housing and further component parts of the internal combustion engine, the further component preferably being the cylinder head and/or the spark plug sleeve which is mounted in the cylinder head. Such a sealing ring could be made out of copper or a copper alloy or any other suitable material.

The spark plug comprises an ignition means, which could, for example, comprise at least one middle electrode and at least one ground electrode, wherein there is a spark gap between the at least one middle electrode and the least one ground electrode. But, as mentioned before also embodiments, wherein the ignition means comprise a laser ignition or other forms of ignition are conceivable.

It can be provided that an electrical connection for connecting the spark plug with an electrical power supply is arranged at an end of the spark plug facing away from the ignition means.

It can be provided that the at least one ground electrode carrier is:

- attached to or integrated in the housing, wherein the at least one ground electrode is preferably connected to the ground electrode carrier by laser beam welding, or
- attached to or integrated in the flow control element, wherein the at least one ground electrode is preferably connected to the ground electrode carrier by laser beam welding, or
- arranged between the housing and the flow control element.

It can be provided that at least one middle electrode is connected to a centrally arranged middle electrode carrier, preferably connected to the middle electrode carrier by welding, preferably laser beam welding or brazing.

It can be provided that an insulator is arranged between the middle electrode carrier and the ground electrode carrier.

It can be provided that the at least one ground electrode is designed as a ring electrode, wherein the ring electrode surrounds a middle electrode of a circular shape at least partially, wherein an annular spark gap is formed between the ground electrode and the middle electrode. Preferably, the ground electrode is designed as a ring electrode having an inner diameter of 4-6 mm.

Of course, any shape of the electrode can be provided, as long the at least one spark gap is comprising a uniform distance, i.e., the areas of the ground electrode and the center electrode building the spark gap are parallel in the case of flat electrodes or concentric in the case of annular electrodes.

Regarding a method for producing a spark plug, the following steps are provided:

- providing a housing of the spark plug,
- providing a mounting portion, in particular a thread, for mounting the spark plug in an internal combustion engine on the housing,
- providing an ignition means facing the combustion chamber, when the spark plug is mounted in the internal combustion engine,
- providing a sealing area, in particular of a conical shape, on the housing for sealing the combustion chamber against the environment, wherein the sealing area is arranged between the mounting portion and an end of the housing, which end faces the combustion chamber when the spark plug is mounted in the internal combustion engine, and
- attaching or integrating a flow control element at or in the end portion of the housing, wherein the flow control element projects beyond the ignition means in a direction towards the combustion chamber when the spark plug is mounted in the internal combustion engine.

It can be provided that that the sealing area is formed by a machining process.

The middle electrode and/or the ground electrode can comprise or consist of a precious metal, such as, e.g., Iridium Rhodium (IrRh), or Iridium Rhenium (IrRe), or other Iridium alloys.

The middle electrode carrier can be viewed as part of the ignition means.

It may be provided that the flow control element extends 3.5-7.5 mm, preferably 5-6 mm, beyond the ground electrode and/or the middle electrode and/or the spark gap in a direction of the main combustion chamber when the spark plug is mounted measured parallel to a center axis of the spark plug.

It can be provided that the flow control element has a length of 7-9 mm and/or an outer dimeter of 11-13 mm, preferably 9-11 mm.

Aspects of the invention can be implemented on all the cylinders of an internal combustion engine. It is of course conceivable to use aspects of the invention only on a single or a specific group of cylinders of the internal combustion engine.

As mentioned before, aspects of the invention can be used on gas engines, particularly preferably gas engines without pre-chambers, the gas engines driving a generator for generating electrical energy or driving pumps for, e.g., the oil industry. Such combinations of gas engines driving a generator are called gensets.

BRIEF DESCRIPTION OF THE DRAWINGS

Further details and advantages of the invention are apparent from the accompanying figures and the following description of the drawings. The figures show.

DETAILED DESCRIPTION

Figure 1:
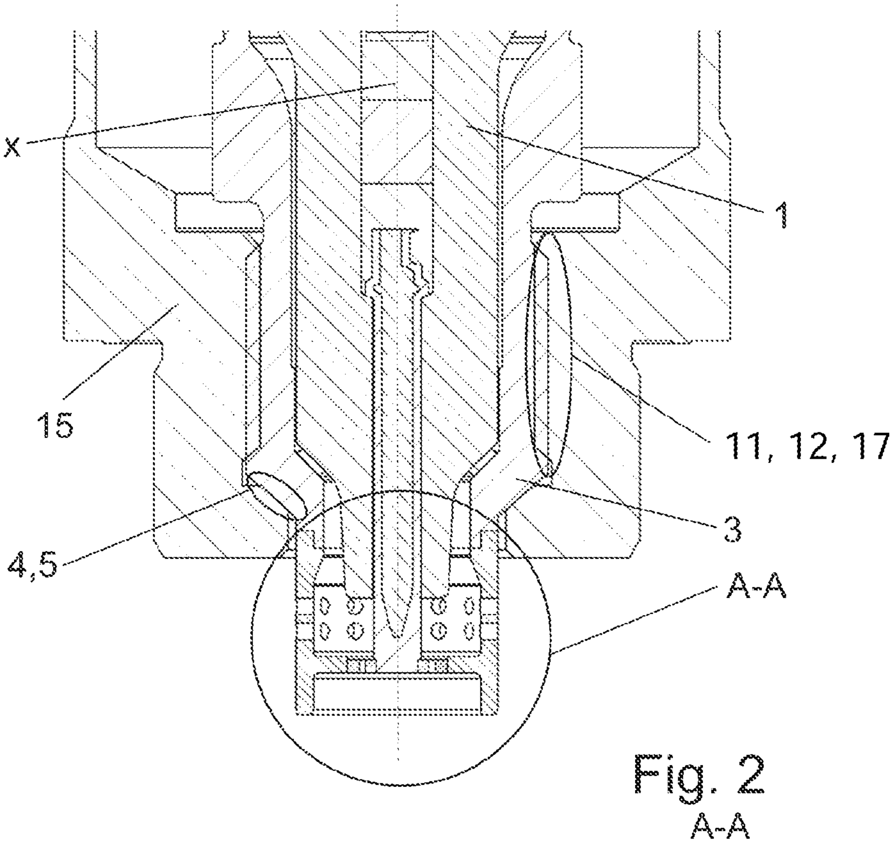
FIG. 1 illustrates a first embodiment of a spark plug according to certain aspects of the invention.

FIG. 1 shows a first embodiment of a spark plug 1, according to aspects of the invention, mounted in the spark plug sleeve 15. The spark plug 1 is connected to a spark plug sleeve 15 by a mounting portion 11, which is provided by an external thread 12 of the spark plug 1 in conjunction with the internal thread 17 of the spark plug sleeve 15.

Figure 2:
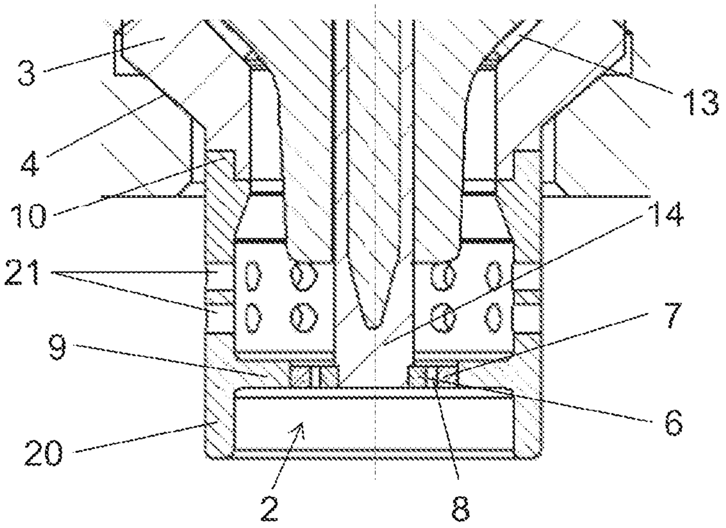
FIG. 2 illustrates the detail view characterised in FIG. 1.

FIG. 2 shows the detail view indicated by A-A in FIG. 1.

The sealing area 4 (which is provided by the chamfer 5) of the spark plug 1 can be braced against a surface of the spark plug sleeve 15 by help of the threaded connection.

The spark plug 1 comprises an ignition means 2 embodied as a middle electrode 6 and a ground electrode 7, wherein there is a spark gap 8 between the middle electrode 6 and the ground electrode 7. The ground electrode 7 is arranged on the ground electrode carrier 9.

In this specific embodiment, the flow control element 20, which surrounds the ignition means 2, is formed by a separate component part (separate from the housing 3).

The housing 3 comprises the sealing area 4. The second component (which actually carries the ground electrode 7 which is arranged at the ground electrode carrier 9) is provided by the flow control element 20. The flow control element 20 is connected to the spark plug body, e.g., by laser beam welding.

The housing 3 comprises a ledge 10, wherein the separate flow control element 20 is arranged at the ledge 10 of the housing 3. Of course, the flow control element 20 can be arranged at the front portion (terminal portion) of the housing without such a ledge 10.

The flow control element 20 carries the ground electrode carrier 9 and the latter carries the ground electrode 7. Therefore, in this specific embodiment, the flow control element 20 can be considered as a part of the ground electrode carrier 9. The ground electrode 7 is connected to the ground electrode carrier 9, e.g., by laser beam welding.

The flow control element 20 has openings 21, which permit good access for the mixture. The openings 21 can be in the form of bores, slots, polygons, or ellipses, or of a similar shape.

Figure 3:
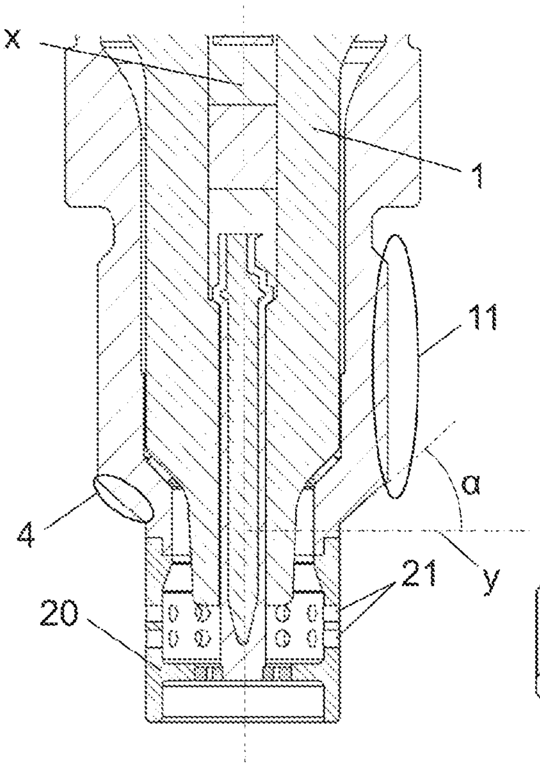
FIG. 3 illustrates the embodiment of FIG. 1 in an unmounted state.

The flow control element 20 and the ground electrode carriers 9 can be produced in one piece (as shown in the FIGS. 1-3). It is also possible to provide an annulus shaped metal pieces or at least one rectangular metal parallelepipeds to be welded as ground electrode carrier 9 to or into the flow control element 20.

The ground electrode carrier 9 is provided with a metal plate as the ground electrode 7, wherein the ground electrode 7 is welded to the ground electrode carrier 9, preferably by means of a laser at one side or on both sides. The welding is such that the gap is closed at the electrode sides. In other words, between the ground electrode 7 and the ground electrode carrier 9, there is in this embodiment no open gap (or aperture) through which gas can enter.

The welding processes can employ pulsed lasers, continuously operating lasers (CW-lasers), electron beam welding processes, or vacuum and high-vacuum brazing processes as well as plasma welding or resistance welding.

As shown, the middle electrode 6 of the spark plug 1 is welded to a middle electrode carrier 14. The spark position can be established by the middle electrode carrier 14 in relation to the flow control element 20 and the ground electrode carrier 9.

The middle electrode 6 is also connected to the middle electrode carrier 14, preferably by laser beam welding.

Between the ceramic insulator and the housing 3, a gasket 13 is arranged.

The spark plug body (housing 3) further comprises a mounting portion 11, for mounting the spark plug 1 in an internal combustion engine and/or in a cylinder head and/or in a spark plug sleeve. The mounting portion 11 is provided in this embodiment as (external) thread 12.

Figure 4:
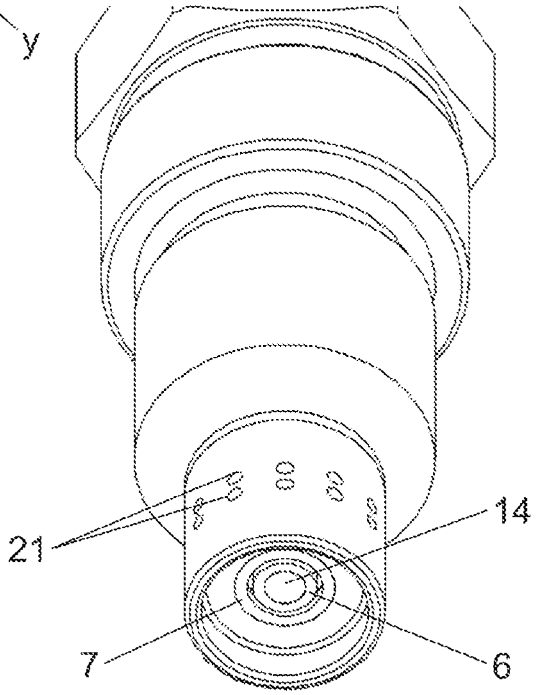
FIG. 4 illustrates an isometric view of an embodiment similar to FIG. 1.

FIG. 3 shows the embodiment of FIG. 1 and FIG. 2 of a spark plug 1, according to aspects of the invention, in an unmounted state. FIG. 4 shows the same embodiment in a perspective view.

The sealing area 4 in the form of the chamfer 5 is designed with an angle α with respect to a perpendicular y of a center axis x of the spark plug 1.

This can be seen in more detail in FIG. 3. FIG. 3 shows an embodiment of a spark plug 1, according to aspects of the invention, with a chamfer 5 at angle α of 41° with respect to the perpendicular y of a center axis x of the spark plug 1.

The spark plug 1 can be substantially symmetric with respect to the center axis x.

It can be seen in FIG. 4 that the ground electrode 7 is designed as a ring electrode, wherein the ring electrode surrounds the middle electrode 6, wherein an annular spark gap 8 is formed between the ground electrode 7 and the middle electrode 6. The middle electrode 6 is in this case also shaped as a ring electrode welded to the middle electrode carrier 14.

Figure 5:
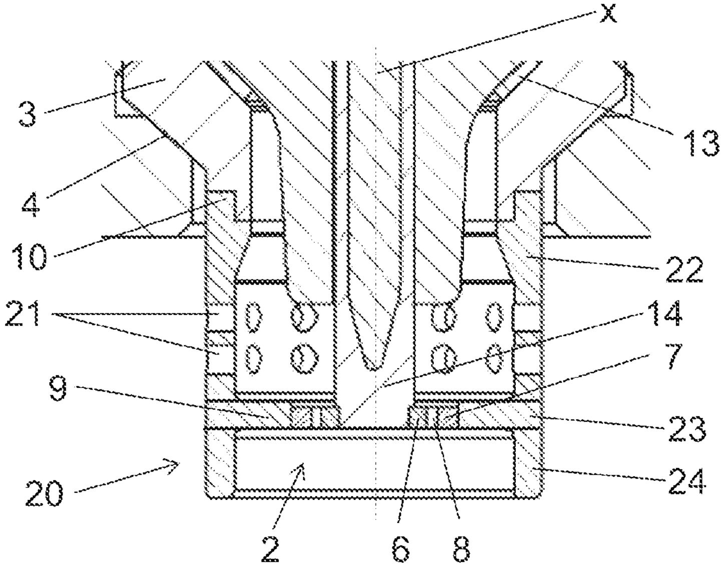
FIG. 5 illustrates a second embodiment of a spark plug according to certain aspects of the invention.
Figure 6:
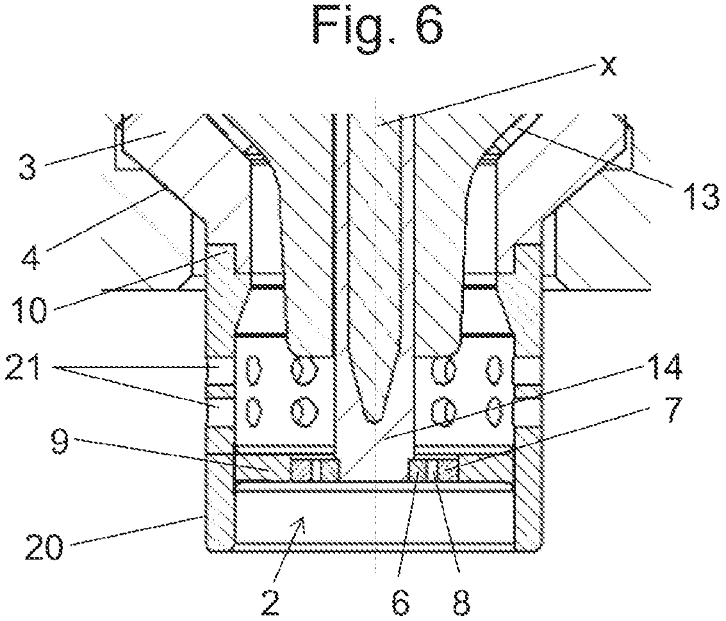
FIG. 6 illustrates a third embodiment of a spark plug according to certain aspects of the invention.

FIG. 5 shows a similar embodiment in detail view analogous to FIG. 2 with the difference that the flow control element 20 of FIG. 6 is designed by three separate component parts 22, 23, 24.

The first separate component part 22 of the flow control element 20 is attached to the housing 3, to be precise, attached at the ledge 10 of the housing 3. The first separate component part 22 is used as spacer.

The second separate component part 23 of the flow control element 20 is attached to the first separate component part 22 and immediately surrounds the ignition means 2. The ground electrode 7 is attached to the second separate component part 23 of the flow control element 20, such that the second separate component part 23 can be seen as the ground electrode carrier 9. The ground electrode carrier 9 and the second separate component part 23 are joined together by welding, preferably laser beam welding or brazing.

The third separate component part 24 of the flow control element 20 is attached to the second separate component part 23 and improves the effect of the first separate component part 22 and the second separate component part 23 as flow control element 20.

The separate component parts 22, 23, 24 are joined together by welding, preferably laser beam welding or brazing. The combination of the separate component parts 22, 23, 24 may be seen as ground electrode carrier 9 and flow control element 20.

FIG. 6 discloses a similar (third) embodiment in detail view analogous to FIG. 5 with the difference that the flow control element 20 of FIG. 6 is designed as one single component part, wherein the ground electrode carrier 9 is arranged at the inner surface of the flow control element 20.

The ground electrode carrier 9 is arranged at the inner diameter of the flow control element 20, wherein the ground electrode carrier 9 is fixed by welding or brazing at the flow control element 20.

Figure 7:
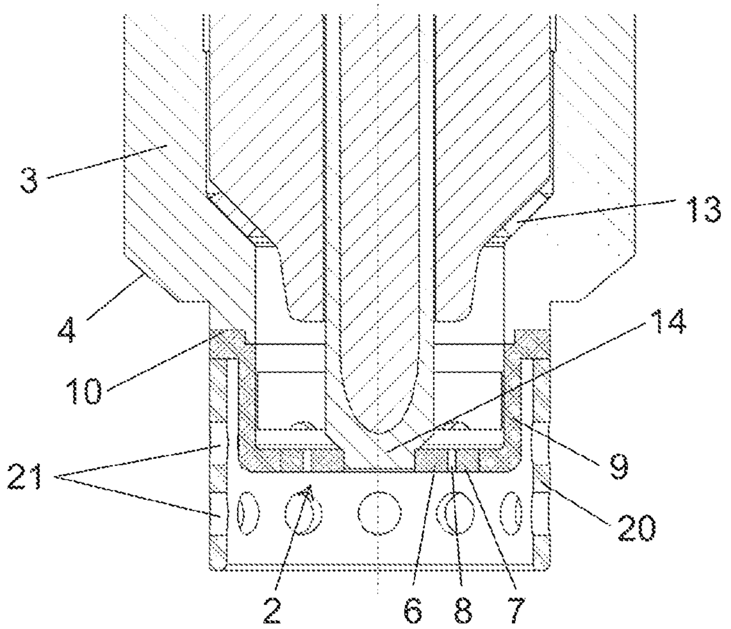
FIG. 7 illustrates a fourth embodiment of a spark plug according to certain aspects the invention.

FIG. 7 shows a fourth embodiment of a spark plug 1 according to aspects of the invention. Compared to the previous embodiments, the embodiment of FIG. 7 comprises a ground electrode carrier 9, which acts as intermediary part through which the flow control element 20 is attached to the housing 3.

The ground electrode carrier 9 is attached to the housing 3, to be precise, attached at the ledge 10 of the housing 3.

The ignition means 2 is embodied as a middle electrode 6 and a ground electrode 7, wherein there is a spark gap 8 between the middle electrode 6 and the ground electrode 7. The ground electrode 7 is fixed on the ground electrode carrier 9 by welding, preferably laser beam welding or brazing.

The flow control element 20 is connected to the ground electrode carrier 9, e.g., by welding, preferably laser beam welding or brazing.

Figure 8:
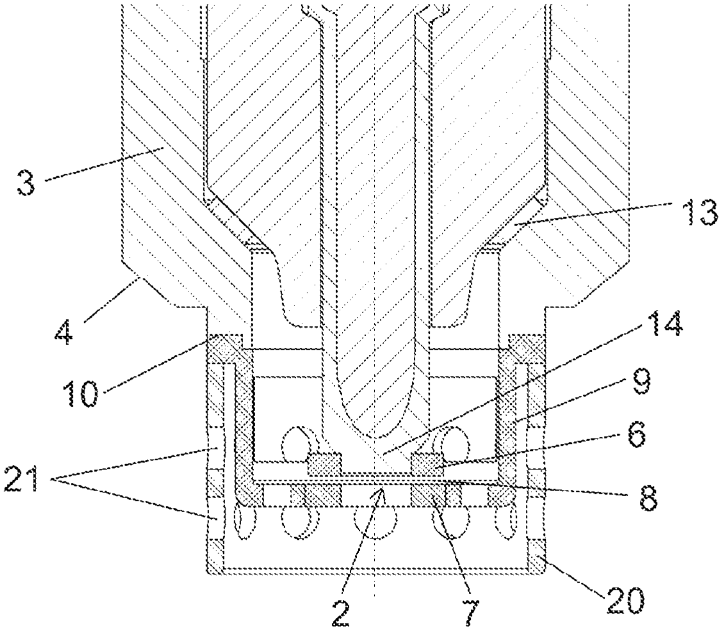
FIG. 8 illustrates a fifth embodiment of a spark plug according to certain aspects the invention.

FIG. 8 shows a fifth embodiment of a spark plug 1 according to aspects of the invention. Compared to FIG. 7, in FIG. 8 the ground electrode carrier 9 is designed in such a way that the middle electrode 6 and the ground electrode 7 are distanced in a direction along the center axis X of the spark plug 1, wherein the spark gap 8 is arranged between the ground electrode 7 and the middle electrode 6. Therefore, the sparks extend parallel to the center axis X of the spark plug 1.

For all embodiments, it can be provided that at least the sealing portion is coated, preferably having a higher degree of hardness than the material forming the sealing portion. More preferred is an anti-corrosive coating with before-mentioned features.

Advantageously, such a coating not only prevents corrosive wear in the said area, but also prevents tribological wear of the sealing area.

As an example, the coating can be a CrWC (Chrome-Wolfram carbide) coating, but of course other coatings exhibiting the before-mentioned features are conceivable.

The coating is preferably generated by a PVD-coating process (Physical Vapor Deposition).

REFERENCE SIGNS

1. spark plug
2. ignition means
3. housing
4. sealing area
5. chamfer
6. middle electrode
7. ground electrode
8. spark gap
9. ground electrode carrier
10. ledge
11. mounting portion
12. external thread
13. gasket
14. middle electrode carrier
15. spark plug sleeve
16. screw portion (spark plug hole)
17. internal thread
18. sealing portion
19. further chamfer
20. flow control element
21. opening
22. first separate component part of the flow control element
23. second separate component part of the flow control element
24. third separate component part of the flow control element
α angle
x center axis
y perpendicular of center axis

The invention claimed is:

1. An apparatus, comprising:

a spark plug for igniting a combustible fuel in an internal combustion engine, comprising:

a mounting portion comprising a thread configured to mount the spark plug in the internal combustion engine, an igniter configured to face the combustion chamber, when the spark plug is mounted in the internal combustion engine, and a sealing area having a conical shape configured to seal the combustion chamber against the environment, wherein a housing of the spark plug comprises the sealing area and the sealing area is located between the mounting portion and an end portion of the housing, which end portion faces the combustion chamber when the spark plug is mounted in the internal combustion engine, wherein the spark plug further comprises a flow control element attached to or integrated in the end portion of the housing, wherein the flow control element projects beyond the igniter in a direction towards the combustion chamber when the spark plug is mounted in the internal combustion engine, wherein the spark plug excludes a pre-chamber.

2. The apparatus as set forth in claim 1, wherein the sealing area is located between the mounting portion and the flow control element on an outer surface of the housing, near or at a transition of the housing into the flow control member.

3. The apparatus as set forth in claim 1, wherein the flow control element is formed by at least one separate component part, wherein the at least one separate component part is arranged at the housing, wherein the housing and the at least one separate component part are connected by a welded joint.

4. The apparatus as set forth in claim 3, wherein the housing comprises a ledge, wherein the at least one separate component part is arranged at the ledge of the housing.

5. The apparatus as set forth in claim 1, wherein the sealing area is located at a terminal portion of the housing, wherein the terminal portion faces the combustion chamber, when the spark plug is mounted in the internal combustion engine.

6. The apparatus as set forth in claim 1, wherein the flow control element is attached to the housing with a ground electrode carrier as an intermediary part.

7. The apparatus as set forth in claim 6, wherein the ground electrode carrier is:

attached to or integrated in the housing; or attached to or integrated in the flow control element; or arranged between the housing and/or the flow control element.

8. The apparatus as set forth in claim 1, wherein the flow control element has a cylindrical wall extending in the direction towards the combustion chamber and terminating with a circular opening.

9. The apparatus as set forth in claim 8, wherein the flow control element extends in the direction towards the combustion chamber at least 3.5 mm beyond the igniter.

10. The apparatus as set forth in claim 1, wherein the igniter comprises at least one middle electrode and at least one ground electrode, wherein a spark gap is disposed between the at least one middle electrode and the at least one ground electrode.

11. The apparatus as set forth in claim 10, wherein the at least one middle electrode is connected at a centrally arranged middle electrode carrier.

12. The apparatus as set forth in claim 10, wherein the at least one ground electrode comprises a ring electrode, the at least one middle electrode comprises an annular middle electrode, the ring electrode at least partially surrounds the annular middle electrode, and the spark gap comprises an annular spark gap between the ring electrode and the annular middle electrode.

13. The apparatus as set forth in claim 12, wherein the flow control element extends in the direction towards the combustion chamber at least 3.5 mm beyond the ring electrode, the annular middle electrode, and the annular spark gap.

14. The apparatus as set forth in claim 1, comprising the internal combustion engine, a cylinder head, and/or a spark plug sleeve having the spark plug.

15. A method, comprising:

attaching or integrating a flow control element at or in an end portion of a housing of a spark plug, wherein the spark plug comprises a mounting portion having a thread, an igniter at the end portion, and a sealing area having a conical shape between the mounting portion and the end portion, wherein the flow control element projects beyond the igniter in a direction towards a combustion chamber when the spark plug is mounted in the internal combustion engine, wherein the spark plug excludes a pre-chamber.

16. An apparatus, comprising:

a spark plug, comprising:

a housing;

a mounting portion having a thread;

a sealing portion; and an end portion comprising an igniter having one or more electrodes, and a flow control sleeve disposed about the igniter and extending beyond the igniter away from the mounting portion, wherein the spark plug excludes a pre-chamber.

17. The apparatus of claim 16, wherein the flow control sleeve comprises a plurality of radial openings.

18. The apparatus of claim 17, wherein the plurality of radial openings are disposed between the mounting portion and the one or more electrodes.

19. The apparatus of claim 16, wherein the one or more electrodes comprises at least first and second annular electrodes and an annular spark gap.

20. The apparatus of claim 16, comprising an internal combustion engine having one or more of the spark plug.

* * * * *